Dec. 17, 1957 — A. F. PEKRUL — 2,816,767
TOOL HOLDER
Filed Aug. 10, 1953 — 2 Sheets-Sheet 2

INVENTOR.
Arthur F. Pekrul
By Mitchell Bechert
ATTORNEYS

United States Patent Office 2,816,767
Patented Dec. 17, 1957

2,816,767

TOOL HOLDER

Arthur F. Pekrul, New Britain, Conn., assignor to The New Britain Machine Company, New Britain, Conn., a corporation of Connecticut Application August 10, 1953, Serial No. 373,197

7 Claims. (Cl. 279—1)

My invention relates to a tool holder and, more particularly, to a tool holder having means for moving a tool bar or other tool carrying member so as to avoid draw back marks and also to permit such transverse movement of a cutting tool as to permit necking or boring or turning or the like behind a shoulder.

It is an object of the invention to provide an improved tool holder for carrying a boring or like tool and usable either in boring, turning or like operations so arranged as to avoid draw back marks on the work and arranged for effecting transverse movement of a tool to permit a necking, shouldering or similar operation.

It is another object to provide an improved tool holder which has few parts which can wear or get out of order.

Another object is to provide a tool holder which is so closed in or housed as to prevent chips or other foreign matter from getting between any of the moving parts to cause inaccuracies or other ill effects.

It is still another object to provide an improved form of tool holder in which the parts may be very easily and readily adjusted for accurate work.

Another object is to provide a diaphragm tool holder in which the transverse movement of the tool relative to the holder is directly related to the flexing of the diaphragm.

It is another object to provide an improved form of tool holder for a boring tool or the like, which may be very nearly balanced and therefore operated at very high speeds.

In the drawings, which show for illustrative purposes only a preferred form of the invention:

Figure 1:
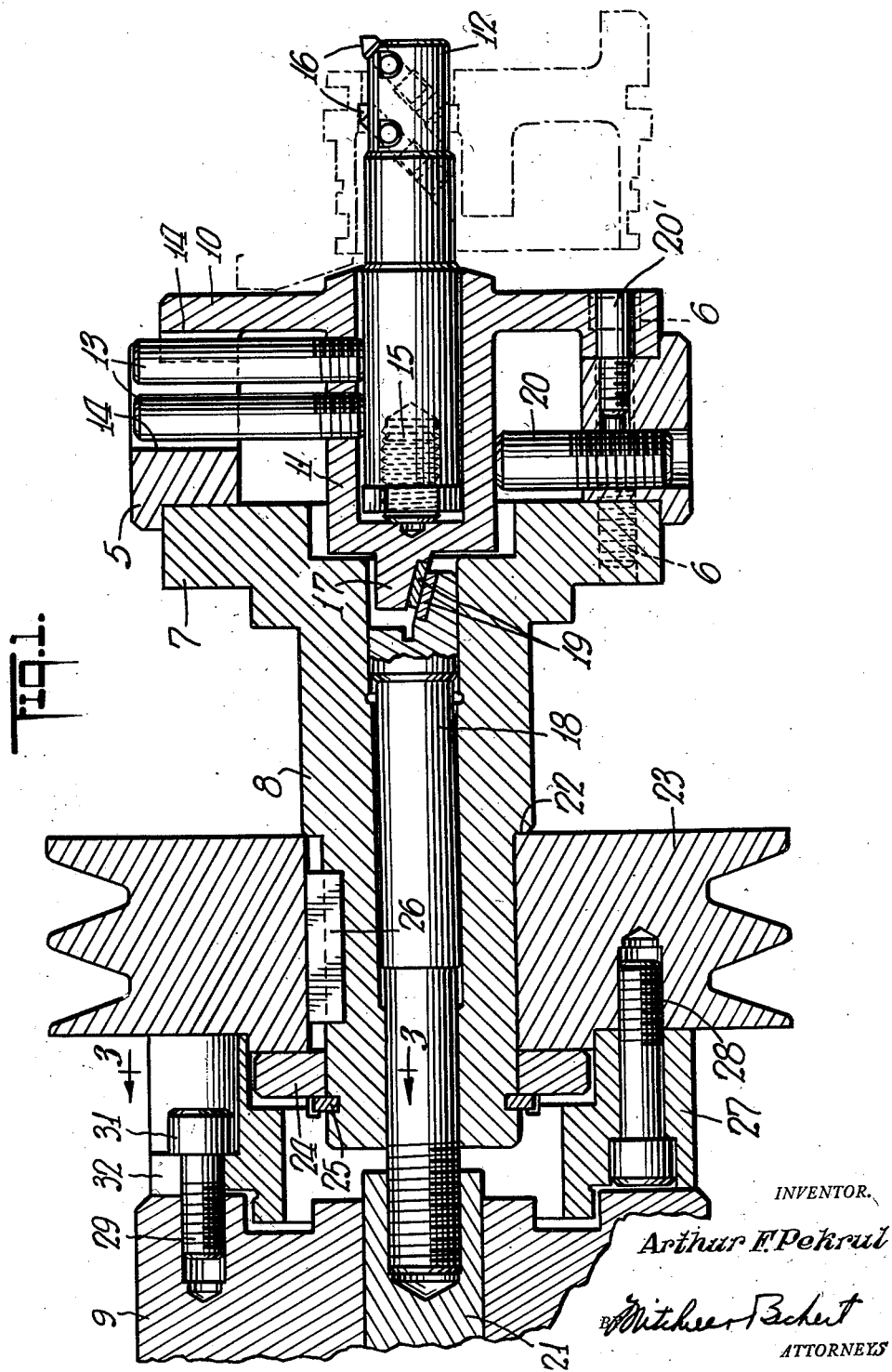
Fig. 1 is a central axial section through a tool holder and associated parts taken substantially in the planes of the lines 1—1 of Fig. 2.
Figure 2:
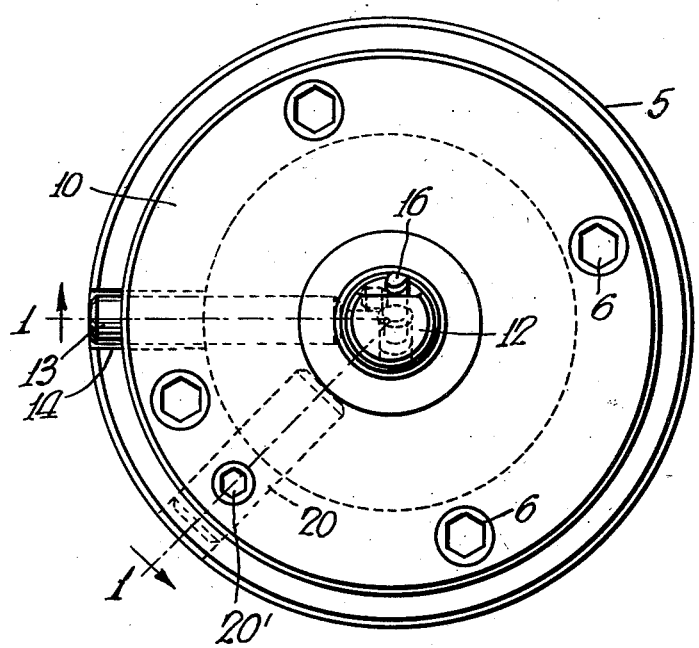
Fig. 2 is a view in right-hand elevation of the tool holder shown in Fig. 1.
Figure 3:
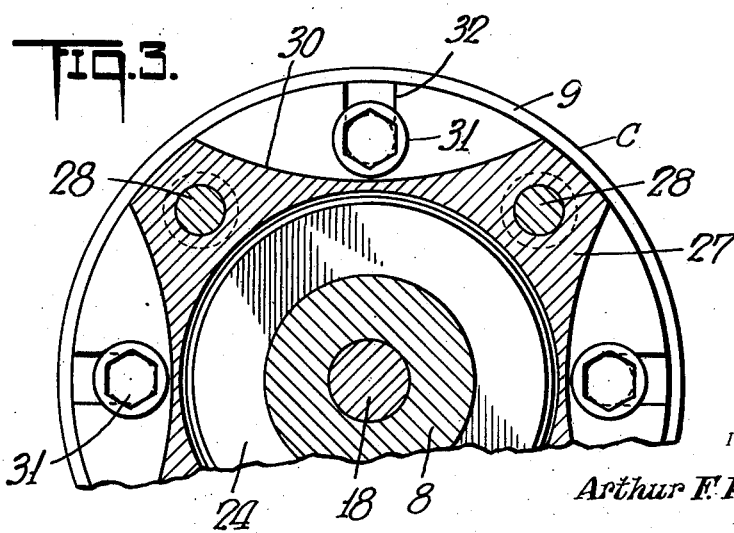
Fig. 3 is a fragmentary sectional view taken substantially in the plane of the line 3—3 of Fig. 1.

Briefly stated, in a preferred form of the invention, I employ a tool holder for a boring or other similar tool in which the axis of the tool bar or shank is substantially coincident with the axis of the spindle and tool holder. The tool bar is carried by a diaphragm and I provide means for flexing or warping the diaphragm so as to throw the forward end of the tool bar transversely so that the tool may be withdrawn after a cut without making any draw back marks, or which may be moved transversely for the purpose of bringing the tool into cutting position and so arranged that when the warping force is removed from the diaphragm the tool may spring back so as to prevent draw back marks.

In the preferred form, the tool holder comprises a tool head or body 5, which is secured as by means of screws 6 to a second body part 7 which has a cylindrical extension or sleeve portion 8 to be secured to the rotating spindle 9, as will be later described.

The tool head 5 carries a diaphragm 10, which is secured thereto as by means of the screws 6 heretofore noted, or by other screws not shown. In the preferred form, the diaphragm has a rearward tubular extension 11 bored out to receive a tool bar or shank 12, such as a boring bar. The boring bar may be held in place, as by means of clamping screws 13 threaded in the extension 11 and engageable with the bar 12, as will be clear. These screws 13 are accessible through an opening in the body or head, and there is ample clearance, as indicated at 14, to permit transverse movement of the screws 13, for a purpose to be described. The tool bar 12 may carry a backing screw 15, to engage the bottom of the bore in the extension 11, as will be understood.

It will be seen that, if the diaphragm 10 is warped, as by moving the extension 11 upward as shown in Fig. 1, a tool 16 carried by the tool bar 12 will be moved transversely and downwardly so that after the cut the tool may be moved away transversely to the surface, to avoid draw back marks. On the other hand, the tools may normally be in a given position and the diaphragm then warped or flexed so as to move the tools 16 transversely into cutting positions. In that case the tool bar 12 would be rotated 180° to put the tools on the bottom of the bar as seen in Fig. 1. In the form shown, the diaphragm is warped by means for moving the rearward extension 11 in a transverse direction. As illustrated, the extension 11 has a rearwardly projecting lug 17 thereon, and an actuating rod 18, slidable centrally through the sleeve member 8, has a slabbed-off portion adjacent the lug 17. The lug 17 and the slabbed-off portion on the actuating rod 18 are arranged at an angle to the axis of the tool holder and may be provided with hardened wear surfaces, so that, when the rod 18 is moved toward the right, as shown in Fig. 1, the inclined wear surfaces will cause the rearward extension to be swung in a clockwise direction, and the diaphragm will be warped and the tool holder 12 will be moved in a clockwise direction, for the purpose heretofore noted.

When the actuating rod 18 is retracted toward the left, the natural resiliency of the diaphragm 10 will cause the extension 11 to swing in a counter-clockwise direction and the diaphragm and tool bar 12 will assume their normal positions. In order to pre-load the diaphragm, I may provide an adjustable abutment 20 in the form of a screw passing through a threaded opening in the body member 5 and in position to be engaged by the extension 11, thus when the screw 20 is moved inwardly extension 11 will be swung in a clockwise direction and the diaphragm pre-stressed. Such pre-stressed or pre-loaded position may be considered as the normal condition and the tools set and the parts centered in such normal position. A set screw 20' may be employed to hold the backing screw 20 in place.

The actuator 18 may be moved by any suitable means, but in one form it is moved as by means of a piston rod 21 actuated by a piston carried with the spindle 9, as will be understood.

The tool holder, as described, is designed to be removably attached to spindle 9, and in the form shown I may employ the following parts. The rearward extension or sleeve portion 8 of the head or body may be turned down to provide a shoulder 22 upon which may be mounted a solid pulley 23. The pulley abuts solidly against the shoulder 22, and at the other side there is a securing abutment ring or washer 24, which may be held in place as by means of a snap ring 25, as will be understood, and the pulley 23 is, preferably, keyed to the sleeve 8 by means of a key 26. An adapter plate 27 may be secured to the pulley 23, as by means of cap screws 28, and the adapter plate 27 may be secured to the end of the spindle, as by means of cap screws 29. In the form illustrated, the adapter plate is milled out as shown at 30 to provide free access to the heads 31 of the screws, so that the latter may be actuated by a wrench. The adapter plate is provided with radial slots 32 and there is ample clearance between the sides of the slots and the screws 29 so that when the adapter plate is secured to the spindle 9 there may be slight transverse adjustment of the entire tool holder on the spindle to assist in dynamically balancing the tool holder. Furthermore, the slots 32 will permit the use of longer screws in that the screws may be moved in transversely of the adapter plate and need not be inserted endwise through a hole normally employed in place of the slot.

It will be seen that my improved tool holder is substantially completely closed in or housed and it is well-nigh impossible for any foreign matter to get into the tool holder, so as to affect any of the moving parts. The only sliding parts on the entire device are the actuating rod 18 and the sliding surfaces between the wear plates 19, and all of these surfaces are well protected.

All of the parts are substantially concentrically arranged, so that the tool holder will be almost dynamically balanced and therefore susceptible of rotation at high speed. The size and positioning of the screws, such as the screws 13, 20 and 20', may be such as to assist in dynamically balancing the parts.

The actuator 18 may be so arranged and operated that it moves the tool bar 12 into position to take a cut, or, as shown in Fig. 1, the cut may be taken when the parts are in normal position with the actuating rod 18 retracted.

The diaphragm may be pre-stressed or pre-loaded, as heretofore described, and the pre-loading means illustrated may serve also as a fine adjustment.

As stated, there are a minimum of sliding parts to wear out and the tool holder is almost completely closed, but all parts which need accessibility, such as the means for securing and adjusting the tool bar and pre-loading the diaphragm, are all readily accessible.

While the invention has been described in considerable detail and a preferred form illustrated, it is to be understood that various changes and modifications may be made within the scope of the invention, as defined in the appended claims.

I claim:
1. In a device of the character indicated, a head, a diaphragm carried thereby, a tool bar carried by said diaphragm, means for flexing said diaphragm and moving said tool bar transversely, and a radially adjustable stop member independent of said means to limit movement of said diaphragm in one direction.

2. In a device of the character indicated, a head, a diaphragm carried thereby, a tool bar carried by said diaphragm, one of the said two last-mentioned members having an axial extension thereon, means for moving said extension in one transverse plane for flexing said diaphragm and moving said tool bar, and an adjustable abutment means independent of said first-mentioned means for limiting movement of said tool bar in one direction in said one transverse plane.

3. In a device of the character indicated, a rotatable tool head, a diaphragm carried thereby, means for supporting a tool bar generally axially of said head, said diaphragm having a generally axially extending rearward extension, an actuating member movable axially of said head, said actuating member and rearward extension on said diaphragm having coacting wedging surfaces for moving said extension transversely, and stop means adjustably fixed to said tool head for limiting movement of said diaphragm.

4. In a device of the character indicated, a tool head to be secured to a rotatably spindle, a diaphragm carried by said tool head and having an axial, rearwardly extending, tubular extension thereon, said tubular extension being formed to receive a tool bar extending axially from the head, means for rigidly holding a tool bar in said tubular extension, an axially movable actuating rod in said tool head, said rod and rearward extension on said diaphragm having wedging surfaces for moving said tubular extension and said tool bar carried thereby in a transverse direction, and an adustable stop for limiting movement of said diaphragm, said stop being positioned to limit said diaphragm movement independently of movement of said actuating rod.

5. In a device of the character indicated, a tool head, a diaphragm carried thereby for carrying a tool holding member, means for flexing said diaphragm and moving a tool carried thereby transversely of the tool head, stop means fixedly carried by said tool head for limiting one direction of transverse movement of said diaphragm, means for securing said tool head to a rotatable spindle, said means for securing said tool head to said spindle including longitudinal screws extending through a part of said tool head and engaged to said spindle, said part of said tool head having over-size passages for said screws to permit slight adjustment of said tool head transversely of the axis of the spindle.

6. In a device of the character indicated, a head, a diaphragm carried thereby and having a generally axially directed rearward extension, a tool bar carried by said diaphragm, means for wedging said rearward extension transversely to move said tool bar, a generally radial screw fixedly carried by said head and including a part projecting to be engaged by said rearward extension to limit movement of said extension in one direction.

7. In a device of the character indicated, a head, a flexible diaphragm carried thereby, a tool bar carried by said diaphragm, said diaphragm being flexible in a given transverse plane and having a first position in said plane when in unstressed condition, a stop carried by said head and retaining said diaphragm in a second position in said plane, whereby said diaphragm is preloaded against said stop, and actuating means for flexing said diaphragm beyond said second position in said plane.

References Cited in the file of this patent
UNITED STATES PATENTS

| | | |
|---|---|---|
| 2,232,660 | Guild | Feb. 18, 1941 |
| 2,412,038 | Freisen | Dec. 3, 1946 |
| 2,420,502 | Spira | May 13, 1947 |
| 2,590,068 | Pekrul | Mar. 18, 1952 |